United States Patent
Ohara

(10) Patent No.: US 11,571,949 B2
(45) Date of Patent: Feb. 7, 2023

(54) VEHICLE HEAT EXCHANGE SYSTEM

(71) Applicant: SUBARU CORPORATION, Tokyo (JP)

(72) Inventor: Yuki Ohara, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/366,425

(22) Filed: Jul. 2, 2021

(65) Prior Publication Data

US 2022/0009310 A1   Jan. 13, 2022

(30) Foreign Application Priority Data

Jul. 10, 2020   (JP) .............................. JP2020-119120

(51) Int. Cl.
*B60H 1/00*    (2006.01)
*B60H 1/14*    (2006.01)
*B60H 1/22*    (2006.01)
*B60K 11/04*   (2006.01)

(52) U.S. Cl.
CPC ......... *B60H 1/143* (2013.01); *B60H 1/00278* (2013.01); *B60H 1/2225* (2013.01); *B60K 11/04* (2013.01)

(58) Field of Classification Search
CPC .. B60H 1/143; B60H 1/00278; B60H 1/2225; B60K 11/04
USPC ......................................................... 165/202
See application file for complete search history.

(56) References Cited

U.S. PATENT DOCUMENTS

| | | | |
|---|---|---|---|
| 9,150,080 B2 | 10/2015 | Kamada et al. | |
| 10,371,419 B2* | 8/2019 | Enomoto | B60H 1/00899 |
| 2012/0297805 A1 | 11/2012 | Kamada et al. | |
| 2016/0109163 A1* | 4/2016 | Enomoto | B60H 1/00899 |
| | | | 62/160 |

FOREIGN PATENT DOCUMENTS

JP   2012-248393 A   12/2012

* cited by examiner

*Primary Examiner* — Davis D Hwu
(74) *Attorney, Agent, or Firm* — Smith, Gambrell & Russell, LLP

(57) ABSTRACT

A vehicle heat exchange system includes a coolant circulation circuit, a refrigerant circulation circuit, a pump controller, and a detector. In the coolant circulation circuit, a coolant is circulated. In the refrigerant circulation circuit, a refrigerant is circulated. The pump controller controls a flow rate of the coolant. The detector detects a liquid temperature of the coolant before cooling an electric unit. The coolant circulation circuit includes a radiator that dissipates heat of the coolant having cooled the electric unit. The refrigerant circulation circuit includes an exterior heat exchanger in rear of the radiator. The exterior heat exchanger causes the refrigerant to absorb heat from external air. When the detected liquid temperature is equal to or higher than a predetermined temperature, the pump controller maintains or increases the flow rate. When the detected liquid temperature is lower than the predetermined temperature, the pump controller decreases the flow rate.

2 Claims, 3 Drawing Sheets

VEHICLE HEAT EXCHANGE SYSTEM

CROSS-REFERENCE TO RELATED APPLICATIONS

The present application claims priority from Japanese Patent Application No. 2020-119120 filed on Jul. 10, 2020, the entire contents of which are hereby incorporated by reference.

BACKGROUND

The disclosure relates to a vehicle heat exchange system, and more particularly, to a vehicle heat exchange system mounted on a vehicle using electricity as power.

In recent years, as electric vehicles (EV vehicles) and hybrid vehicles (HV vehicles) have been put into practical use, the capacity of a battery mounted on these vehicles has increased, and an output voltage of the battery has also increased. Electric power supplied from the battery is used not only for allowing a vehicle to travel but also for an air conditioner.

In the electric vehicles and hybrid vehicle, heat is generated during charging or discharging of a battery. A temperature of the battery may become high. In that case, the battery is to be cooled in order to secure the performance of the battery. Therefore, there has been proposed a battery cooling device that detects a temperature of a battery, causes a battery cooler to circulate a refrigerant when the temperature of the battery exceeds a preset upper limit temperature, and causes the battery cooler to stop the circulation of the refrigerant when the temperature of the battery falls below a preset lower limit temperature.

The above-described battery cooling device is configured such that the refrigerant does not flow to an air conditioner side while the refrigerant is flowing to the battery cooler, which may lower the cooling performance of an air conditioner during cooling of the battery. Therefore, a battery cooling device has been proposed in which a branching passage is provided in a refrigerant passage and an amount of the refrigerant flowing to the branching path and the refrigerant passage is adjusted (see Japanese Unexamined Patent Application Publication No. 2012-248393).

Here, the air conditioner for a vehicle provided with the battery cooling device as described above employs a vehicle air conditioner using a heat pump system. Such a vehicle air conditioner circulates a refrigerant in a circulation circuit including a compressor, an interior condenser (that is, an interior heat exchanger), and an exterior heat exchanger, so as to achieve a low temperature and a high temperature with a small amount of energy.

For example, in a heating operation of the vehicle air conditioner, the refrigerant is expanded by an expansion valve, and the refrigerant having a decreased temperature is sent to the exterior heat exchanger. In the exterior heat exchanger, the refrigerant absorbs heat from external air, and the refrigerant is suctioned into the compressor. The compressor compresses the refrigerant, and the refrigerant having a high temperature and a high pressure is discharged from the compressor and is sent to an interior condenser. Conditioned air is heated while passing through the interior condenser, and is supplied into a vehicle cabin for heating. The refrigerant which has dissipated heat in the interior condenser is expanded again by the expansion valve. Accordingly, the refrigerant of the vehicle air conditioner is to absorb heat from the external air in the exterior heat exchanger.

SUMMARY

An aspect of the disclosure provides a vehicle heat exchange system including a coolant circulation circuit, a refrigerant circulation circuit, a pump controller, and a liquid temperature detector. In the coolant circulation circuit, a coolant for cooling an electric unit configured to allow a vehicle to travel is circulated by a pump. In the refrigerant circulation circuit, a refrigerant for interior heating is circulated. The pump controller is configured to control a circulation flow rate of the coolant circulated in the coolant circulation circuit by the pump. The liquid temperature detector is configured to detect a liquid temperature of the coolant before cooling the electric unit. The coolant circulation circuit includes a radiator configured to dissipate heat of the coolant which has cooled the electric unit. The refrigerant circulation circuit includes an exterior heat exchanger disposed behind the radiator. The exterior heat exchanger is configured to cause the refrigerant to absorb heat from external air. When the liquid temperature detected by the liquid temperature detector is equal to or higher than a predetermined temperature, the pump controller is configured to, maintain or increase the circulation flow rate in the coolant circulation circuit. When the liquid temperature detected by the liquid temperature detector is lower than the predetermined temperature, the pump controller is configured to decrease the circulation flow rate in the coolant circulation circuit.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

In a situation where heating is used, a temperature of external air is generally low. A temperature of air passing through an exterior heat exchanger is low, and an amount of heat that a refrigerant can absorb is small. As the temperature of external air decreases, the performance of a heat pump becomes lower. In order to compensate for an insufficient amount of heat, a high voltage heater is to be operated. Electric power for allowing a vehicle to travel is diverted to operate the high voltage heater, which may lead to a decrease in a cruising range of the vehicle.

It is desirable to provide a vehicle heat exchange system capable of preventing a decrease in a cruising range due to power consumption of a high voltage heater or the like without reducing effectiveness of heating even in an environment of low-temperature external air.

Hereinafter, an embodiment of the disclosure will be described with reference to the accompanying drawings.

Figure 1:
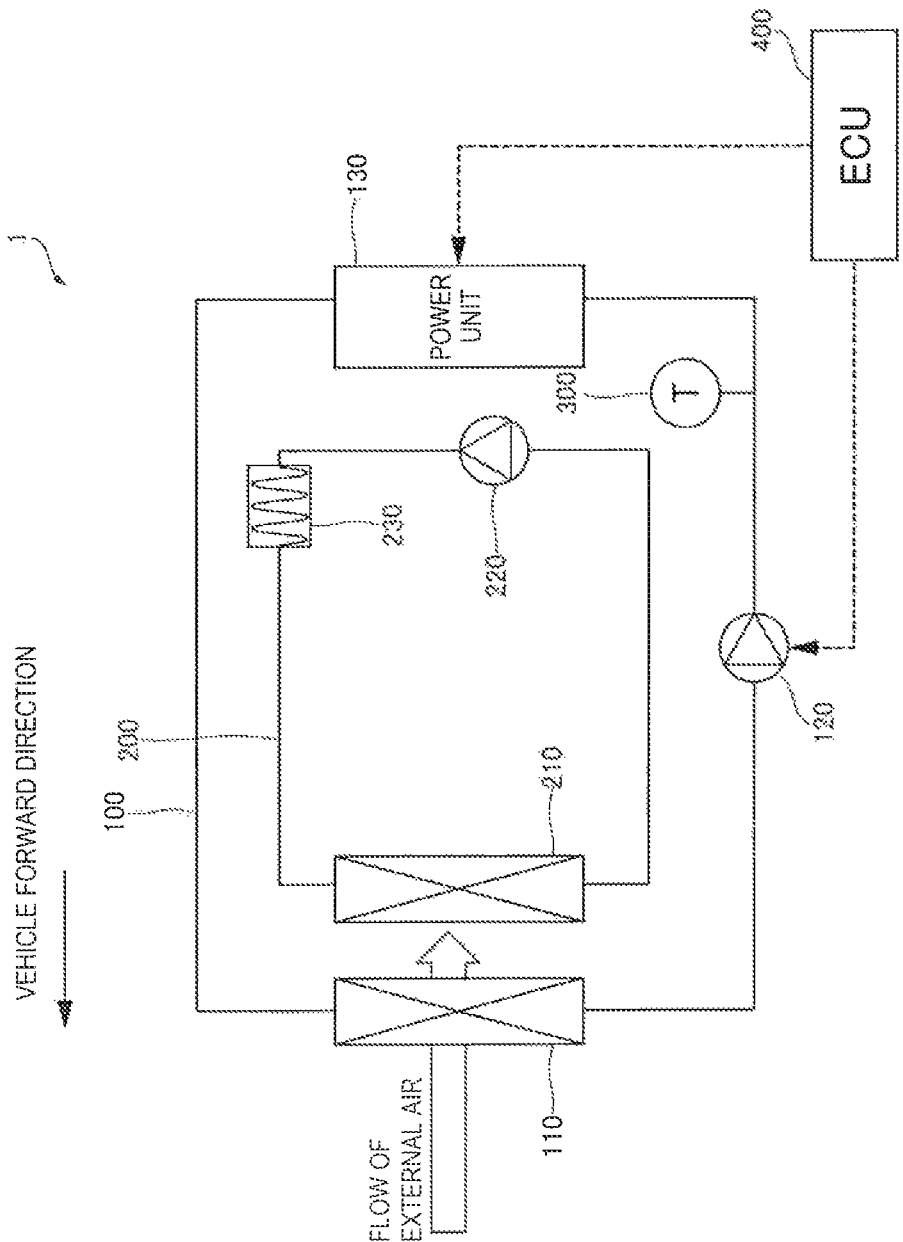
FIG. 1 is a block diagram schematically illustrating a vehicle heat exchange system according to an embodiment of the disclosure.
Figure 2:
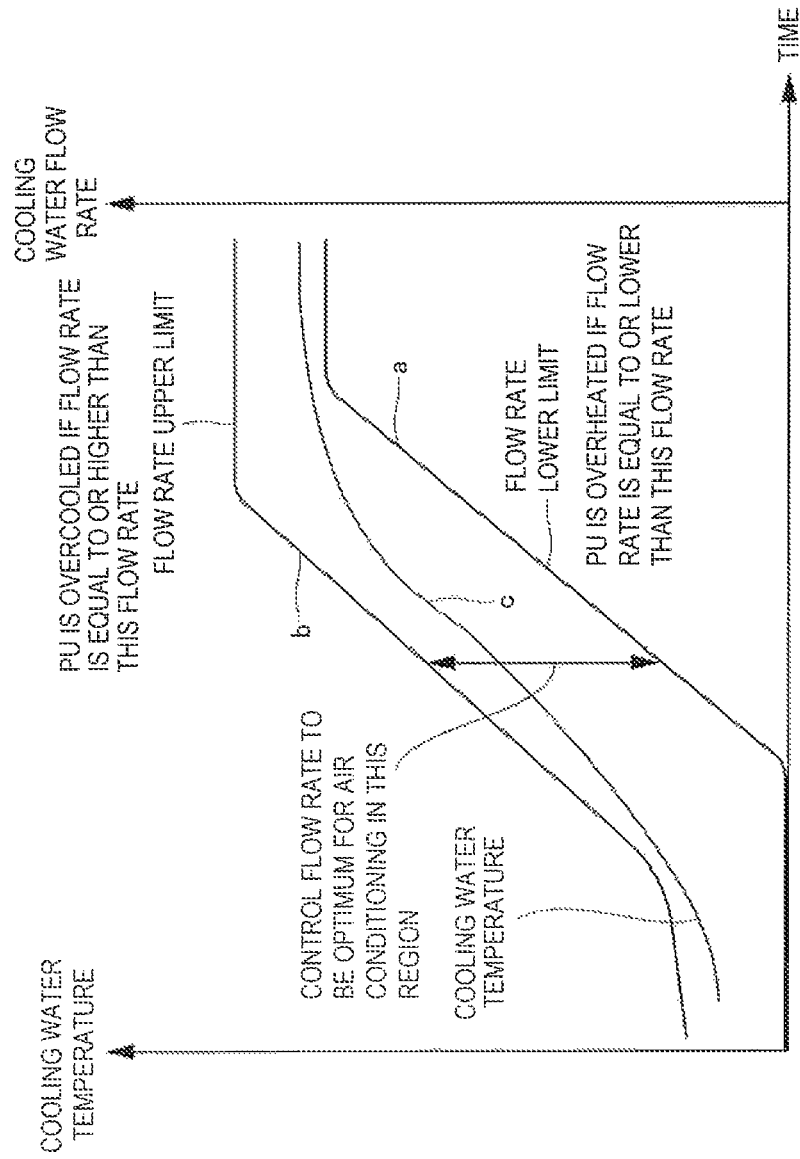
FIG. 2 is a graph illustrating changes in a cooling water flow rate and a cooling water temperature with time elapsing from a start of a power unit.
Figure 3:
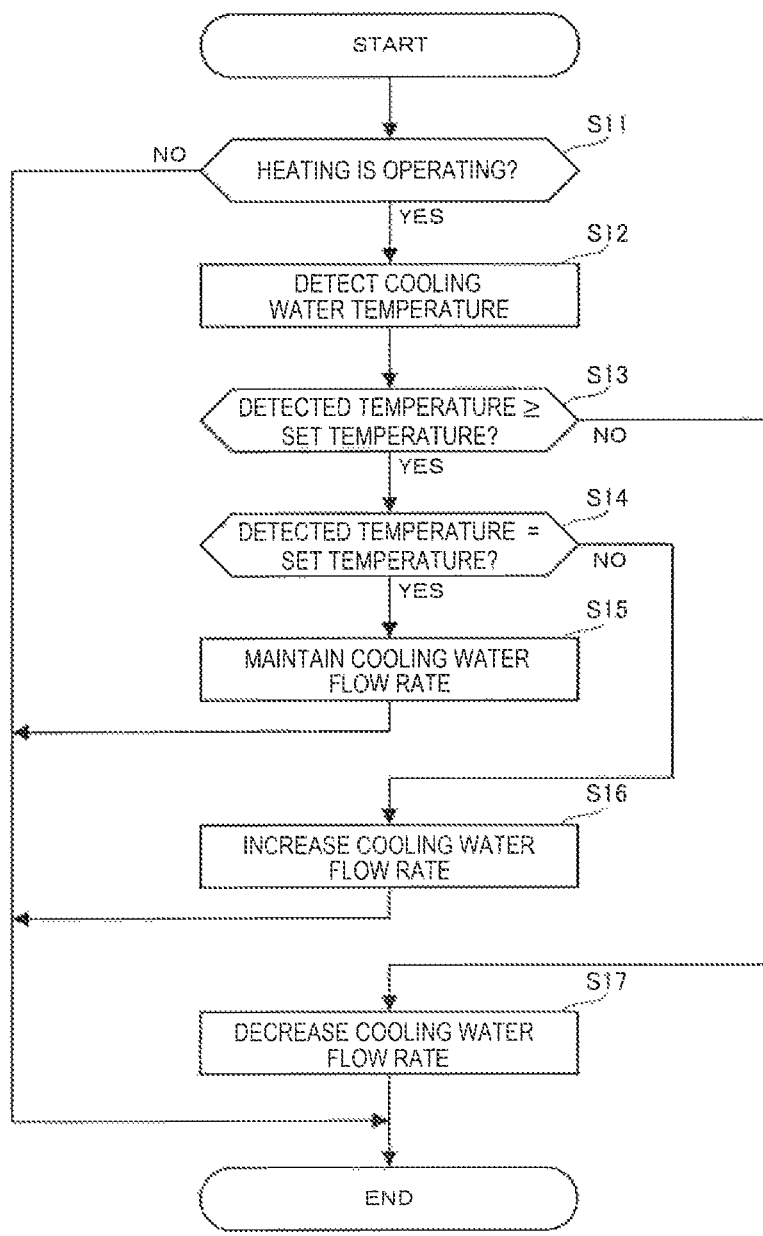
FIG. 3 is a flowchart of a process of controlling an operation of an electric water pump.

FIG. 1 is a block diagram schematically illustrating a vehicle heat exchange system according to the embodiment of the disclosure. FIG. 2 is a graph illustrating changes in a cooling water flow rate and a cooling water temperature with time elapsing from a start of a power unit. FIG. 3 is a flowchart of a process of controlling an operation of an electric water pump.

As illustrated in FIG. 1, a vehicle heat exchange system 1 according to the present embodiment includes a coolant circulation circuit 100, a refrigerant circulation circuit 200, a water temperature gauge 300, and an ECU 400.

Coolant Circulation Circuit 100

The coolant circulation circuit 100 is a circuit in which cooling water for cooling a power unit 130 (which will be described later) circulates. In one embodiment, the power unit 130 may serve as an "electric unit". The coolant circulation circuit 100 includes a radiator 110, an electric water pump 120, and the power unit 130. In the coolant circulation circuit 100, the electric water pump 120 circulates the cooling water through a path coupling the electric water pump 120, the power unit 130, and the radiator 110.

In the present embodiment, the cooling water is circulated in the coolant circulation circuit 100 to cool the power unit 130. The cooling water is illustrative and is not to be construed in any limiting sense. Another coolant may be used in place of the cooling water.

Radiator 110

The radiator 110 is provided in a front portion of a vehicle. The radiator 110 dissipates the heat of heated cooling water to cool the cooling water. In one example, the radiator 110 receives travel wind from in front of the vehicle and wind from a radiator fan (not illustrated). The cooling water of which a temperature has risen in the power unit 130 flows into the radiator 110, and is cooled by the traveling wind and the like in the radiator 110 (for example, in a passage in the radiator 110). The cooling water of which the temperature has been lowered is circulated to the power unit 130 via the electric water pump 120. A temperature of the traveling wind that has taken the heat from the cooling water rises, and the traveling wind flows to a rear of the radiator 110.

Electric Water Pump 120

The electric water pump 120 circulates the cooling water in the coolant circulation circuit 100. That is, the electric water pump 120 delivers the cooling water introduced from the radiator 110 to the power unit 130 and circulates the cooling water in the coolant circulation circuit 100. The electric water pump 120 is supplied with electric power from a battery for traveling (not illustrated).

Power Unit 130

The power unit 130 is what causes the vehicle to travel. Examples of the power unit 130 include a motor, a charger, and a transformer.

Refrigerant Circulation Circuit 200

The refrigerant circulation circuit 200 is a circuit in which a refrigerant for interior heating is circulated. The refrigerant circulation circuit 200 includes an exterior heat exchanger 210, a compressor 220, and a condenser 230 (that is, an interior heat exchanger).

Exterior Heat Exchanger 210

The exterior heat exchanger 210 causes the refrigerant to absorb heat from external air outside the refrigerant circulation circuit 200. In one example, the exterior heat exchanger 210 performs heat exchange between the refrigerant and the external air in front of the vehicle. At this time, if a temperature of the refrigerant is high, the refrigerant cannot receive heat from the external air. Therefore, the refrigerant delivered from the condenser 230 is decompressed by an expansion valve and has a low temperature.

However, if a temperature of the external air is not sufficiently high, the refrigerant cannot absorb heat. Therefore, the radiator 110 is provided in front of the exterior heat exchanger 210 in a vehicle forward direction. With this configuration, the temperature of the traveling wind is raised by the radiator 110 and is then applied to the exterior heat exchanger 210, so that an amount of heat absorbed by the refrigerant can be increased. It is noted that if the traveling wind that passes through the radiator 110 is at a low temperature, simply providing the radiator 110 in front of the exterior heat exchanger 210 may not enable the refrigerant to sufficiently absorb heat as described above.

Compressor 220

The compressor 220 compresses the refrigerant circulating in the refrigerant circulation circuit 200. The compressor 220 increases a pressure and temperature of the refrigerant that has absorbed heat in the exterior heat exchanger 210 to make the refrigerant have a temperature higher than that of interior air.

Condenser 230

The condenser 230 is a heat exchanger that exchanges heat between the refrigerant and conditioned air. The heat exchange warms the conditioned air to be discharged into a vehicle cabin. In one embodiment, the conditioned air mentioned here may serve as "conditioned air to be delivered to a vehicle cabin". That is, the condenser 230 warms the conditioned air by applying the conditioned air to the high-temperature refrigerant delivered from the compressor 220, and discharges the conditioned air into the vehicle cabin.

If it is difficult for the heat, exchange in the condenser 230 to warm the conditioned air to a set temperature, the conditioned air is to be raised to a predetermined temperature by causing the high voltage heater to operate using power of the battery for traveling.

The high voltage heater is used as an auxiliary heating heater that heats the conditioned air. For example, the high voltage heater heats the conditioned air that has passed through the condenser 230, to the set temperature. The high voltage heater is, for example, a PTC heater that generates heat by flowing electricity of the battery through an electric resistance (heater). As a heating technique, a technique of directly heating air is generally used. Alternatively, a technique of heating water to indirectly heat air with warm water may be used as the heating technique. The heating of the conditioned air is not limited to the heating of the conditioned air having passed through the condenser 230. The refrigerant may be warmed directly to raise the temperature of the conditioned air.

Water Temperature Gauge 300

The water temperature gauge 300 detects a temperature (hereinafter referred to as "liquid temperature") of the cooling water between the electric water pump 120 and the power unit 130 of the coolant circulation circuit 100. That is, the water temperature gauge 300 detects the temperature of the cooling water circulating in the coolant circulation circuit 100 before the cooling water cools the power unit 130.

ECU 400

The ECU 400 supervises control of the vehicle. The ECU 400 includes a central processing unit (CPU), a read only memory (ROM) that stores a control program executed by the CPU, a data table, commands, data, and the like, a random access memory (RAM) that temporarily stores data, an electrically erasable and programmable read only memory (EEPROM) including a rewritable nonvolatile memory, and an input/output interface circuit.

Further, the ECU 400 controls a circulation flow rate of the cooling water which the electric water pump 120 circulates in the coolant circulation circuit 100.

In the present embodiment, the control of the electric water pump 120 is performed by the ECU 400 that supervises the entire vehicle. This configuration is illustrative and is not to be construed in any limiting sense. A pump controller that controls the electric water pump 120 may be provided separately from the ECU 400. The ECU 400 controls the circulation flow rate of the cooling water circulated by the electric water pump 120 so as to reduce the influence of an increase in a temperature of the external air in front of the exterior heat exchanger 210 due to the radiator 110 disposed in front of the exterior heat exchanger 210 in the vehicle forward direction even when the exterior heat exchanger 210 is used for cooling. For example, when the exterior heat exchanger 210 is used for cooling, the ECU 400 limits the circulation flow rate of the cooling water circulated by the electric water pump 120 to a minimum flow rate at which the power unit 130 does not overheat, so that an amount of heat exchange in the radiator 110 can be reduced, and the influence of the increase in the temperature of the external air in front of the exterior heat exchanger 210 can be reduced.

Next, the circulation of the cooling water flowing in the coolant circulation circuit 100 will be described.

When the electric water pump 120 is operated, the cooling water is delivered to the power unit 130. The cooling water delivered to the power unit 130 cools respective parts of the power unit 130, becomes high in a temperature, and is supplied to the radiator 110. The heat of the cooling water supplied to the radiator 110 is dissipated by the traveling wind, so as to cool the cooling water. The cooled cooling water is again delivered to the power unit 130 by the electric water pump 120.

While the cooling water is cooled in the radiator 110, heat is given to the traveling wind, and the traveling wind of which the temperature has been raised is supplied to the exterior heat exchanger 210.

Next, the circulation of the refrigerant flowing in the refrigerant circulation circuit 200 will be described.

The refrigerant whose heat has been absorbed in the exterior heat exchanger 210 is compressed and heated by the compressor 220. The refrigerant heated to a high temperature by the compressor 220 is subjected to the heat exchange with the conditioned air in the condenser 230. Conditioned air exchanges heat with the refrigerant in the condenser 230, so that the air in the vehicle cabin can be warmed. Meanwhile, the refrigerant whose heat has been dissipated in the condenser 230 is decompressed by the expansion valve and becomes further low in a temperature. Then, the refrigerant having this low temperature absorbs heat from the external air in the exterior heat exchanger 210.

At this time, since the radiator 110 is disposed in front of the exterior heat exchanger 210 in the vehicle forward direction, the traveling wind that becomes high in a temperature by passing through the radiator 110 hits the exterior heat exchanger 210, and the amount of heat absorbed by the refrigerant can be increased. It is noted that if the traveling wind that has passed through the radiator 110 is at a low temperature, the refrigerant may not sufficiently absorb heat.

Next, a relationship between a flow rate of the cooling water flowing in the coolant circulation circuit 100 and a cooling water temperature will be described.

FIG. 2 is a graph illustrating changes in the cooling water flow rate and the cooling water temperature with time elapsing from a start of the power unit 130.

A temperature of the power unit 130 rises as time elapses from the start of the power unit 130. Therefore, the power unit 130 is to be cooled with the cooling water by circulating the cooling water in the coolant circulation circuit 100. Also, the flow rate of the cooling water is to be increased as time elapses. Further, as illustrated by a curve a in FIG. 2, if the flow rate of the cooling water falls below a predetermined value (flow rate lower limit value of FIG. 2), the power unit 130 would be overheated. It is noted that immediately after the start of the power unit 130, the power unit 130 is cool and is in a warm-promoting region, and thus the cooling water flow rate may be "0".

The cooling water flow rate is determined based on an operation amount of the electric water pump 120. Therefore, as the cooling water flow rate is increased, power consumption is increased. It is noted that if the power unit 130 becomes too hot, operation efficiency deteriorates even when the overheating does not occur. Thus, in a region other than the warm-promoting region, predetermined cooling is to be performed.

Further, as illustrated by a curve b, if the cooling water flow rate is equal to or higher than a predetermined value (flow rate upper limit value of FIG. 2), the power unit 130 is overcooled. That is, if the power unit 130 is overcooled, a viscosity of oil in the power unit 130 increases, and the operation of the power unit 130 deteriorates.

As described above, if the cooling water flow rate is increased, the operation amount of the electric water pump 120 is increased, which not only increases the power consumption, but also causes the operation of the power unit 130 to deteriorate.

If the cooling water temperature decreases, the temperature of the traveling wind that passes through the radiator 110 does not rise. That is, if the temperature of the traveling wind that passes through the radiator 110 does not rise, the refrigerant does not sufficiently absorb heat in the exterior heat exchanger 210, and the high voltage heater may need to be operated. Therefore, electric power for operating the high voltage heater is consumed.

In view of the above, when the cooling water flow rate is within a range between a lower limit value (curve a of FIG. 2) and an upper limit value (curve b of FIG. 2) as illustrated by a curve c, the power unit 130 operates efficiently. The ECU 400 calculates (i) a traveling electric power that is consumed when the power unit 130 operates and (ii) a warm-up electric power consumed by the high voltage heater, and controls the operation amount of the electric water pump 120 so as to minimize a sum of the traveling electric power and the warm-up electric power.

For example, the ECU 400 acquires information on the cooling water temperature from the water temperature gauge 300, estimates a heat generation amount based on a motor rotation speed, and causes the electric water pump 120 to circulate the cooling water at a flow rate that is efficient for air conditioning and is in the range between the upper and lower limit values of the flow rate. A water temperature gauge may be provided at an inlet of the radiator 110. In this case, the ECU 400 estimates a temperature of air passing through the radiator 110 based on (i) information on a cooling water flow rate calculated based on a pump rotation speed, (ii) information on an external air temperature, and (iii) information on a vehicle speed (wind speed), and control the electric water pump 120 to circulate the cooling water at a flow rate that provides a passing air temperature efficient for the exterior heat exchanger 210. In order to apply air that is warmer than the external air to the exterior heat exchanger 210, the ECU 400 may prohibit driving of the electric water pump 120 until the cooling water temperature is higher than the external air by 5° C. or more. This prevents wasteful driving of the pump in a region where effect is weak.

Hereinafter, control of the operation of the electric water pump 120 performed by the ECU 400 will be described. FIG. 3 is a flowchart of a process, performed by the ECU 400, of controlling an operation of the electric water pump 120.

The ECU 400 repeatedly performs the following process of controlling the operation of the electric water pump 120 at predetermined time intervals.

In the process of controlling the operation of the electric water pump 120, first, the ECU 400 determines whether a heating operation is being performed (step S11). If determining that the heating operation is being performed (YES in step S11), the ECU 400 proceeds to step S12. If determining that the heating operation is not being performed (NO in step S11), the ECU 400 ends the process of controlling the operation of the electric water pump 120. During a period other than a period during which the heating operation is performed, the ECU 400 controls the operation of the electric water pump 120 in accordance with another process. For example, the ECU 400 controls the operation of the electric water pump 120 such that the cooling water flow rate is higher than the lower limit value of the cooling water flow rate and is lower than the upper limit value of the cooling water flow rate.

Next, when determining that the heating operation is being performed (YES in step S11), the ECU 400 detects the cooling water temperature. In one example, the ECU 400 acquires the temperature of the cooling water before cooling the power unit 130 that is detected by the water temperature gauge 300 (step S12).

Next, the ECU 400 determines whether the detected temperature of the cooling water is equal to or higher than the set temperature (step S13). Here/the set temperature refers to a water temperature at which the sum of the traveling electric power consumed when the power unit 130 operates and the warm-up electric power consumed when the high voltage heater rises an interior temperature to the set temperature during the air conditioning becomes a minimum value. The set temperature also changes with an operating time of the power unit 130. An optimum value for the power unit 130 is stored, as the set temperature, in the ROM of the ECU 400 in advance.

If determining that the detected temperature is equal to or higher than the set temperature (YES in step S13), the ECU 400 proceeds to step S14. If determining that, the detected temperature is not equal to or higher than the set temperature (the detected temperature is lower than the set temperature) (NO in step S13), the ECU 400 proceeds to step S17.

Next, the ECU 400 determines whether the detected temperature is equal to the set temperature (step S14). In this determination, a value of the set temperature may be values in a certain range. For example, even if the set temperature is 60° C., values in a range of 60° C. to 65° C. may be used as the set temperature, or values in a range of 59° C. to 61° C. may be used as the set temperature.

If determining that the detected temperature is equal to the set temperature (YES in step S14), the ECU 400 proceeds to step S15. If determining that the detected temperature is not equal to the set temperature, that is, determining that detected temperature exceeds the set temperature (NO in step S14), the ECU 400 proceeds to step S16.

Next, if determining that the detected temperature is equal to the set temperature (YES in step S14), the ECU 400 performs a process of maintaining the cooling water flow rate on the electric water pump 120 (step S15).

Here, the ECU 400 performs control so that the sum of the traveling electric power consumed when the power unit 130 operates and the warm-up electric power consumed when the high voltage heater raises the interior temperature to the set temperature during the air conditioning is the minimum value. Therefore, the ECU 400 maintains the cooling water flow rate of the electric water pump 120. The set temperature generally rises as time elapses, and the optimum cooling water flow rate also tends to increase. Therefore, the ECU 400 may control the electric water pump 120 to slightly increase the cooling water flow rate. The set temperature may be set to be higher than an optimum temperature in advance.

After performing the process of maintaining the cooling water flow rate on the electric water pump 120, the ECU 400 temporarily ends the process of controlling the operation of the electric water pump 120.

On the other hand, if determining that the detected temperature is not equal to the set temperature, that is, the detected temperature is higher than the set temperature (NO in step S14), the ECU 400 performs a process of increasing the cooling water flow rate on the electric water pump 120 (step S16).

Here, the sum of the traveling electric power and the warm-up electric power for the high voltage heater decreases as the temperature of the cooling water is decreased. So, the ECU 400 increases the cooling water flow rate of the electric water pump 120. For example, this applies to a case where the refrigerant in the refrigerant circulation circuit 200 can sufficiently absorb heat in the exterior heat exchanger 210, the high voltage heater does not need to be operated, and the power unit 130 is cooled to reduce the traveling electric power.

After performing the process of increasing the cooling water flow rate on the electric water pump 120, the ECU 400 temporarily ends the process of controlling the operation of the electric water pump 120.

Further, if determining that the detected temperature is not equal to or higher than the set temperature, that is, the detected temperature is lower than the set temperature (NO in step S13), the ECU 400 performs a process of decreasing the cooling water flow rate on the electric water pump 120 (step S17).

Here, the sum of the traveling electric power and the warm-up electric power for the high voltage heater decreases as the temperature of the cooling water is increased. So, the ECU 400 decreases the cooling water flow rate of the electric water pump 120. For example, this applies to a case where the refrigerant in the refrigerant circulation circuit 200 cannot sufficiently absorb heat in the exterior heat exchanger 210 and the high voltage heater is to be operated. If a drop in the traveling electric power is larger than power for operating the high voltage heater because the power unit 130 cannot be cooled, the decrease in the cooling water flow rate of the electric water pump 120 is stopped.

After performing the process of decreasing the cooling water flow rate on the electric water pump 120, the ECU 400 temporarily ends the process of controlling the operation of the electric water pump 120.

As described above, in the vehicle heat exchange system 1 according to the present embodiment, the exterior heat exchanger 210 of the refrigerant circulation circuit 200 is disposed in rear of the radiator 110 of the coolant circulation circuit 100 in the vehicle rearward direction, the liquid temperature of the cooling water before cooling the power unit 130 is detected, the circulation flow rate in the coolant circulation circuit 100 is maintained or increased when the detected liquid temperature is equal to or higher than the predetermined temperature, and the circulation flow rate in the coolant circulation circuit 100 is decreased when the detected liquid temperature is lower than the predetermined temperature. Therefore, heat can be appropriately absorbed by the refrigerant in the exterior heat exchanger 210 of the refrigerant circulation circuit 200.

The vehicle heat exchange system 1 according to the present embodiment includes the high voltage heater that raises the temperature of the conditioned air when it is difficult to raise the temperature of the conditioned air to be delivered to the vehicle cabin to the set temperature by heating the conditioned air with the refrigerant. A determination temperature used in determining whether to decrease the circulation flow rate in the coolant circulation circuit 100 is set to a temperature at a time when the sum of the traveling electric power consumed when the power unit 130 operates and the warm-up electric power consumed when the high voltage heater raises the temperature of the conditioned air to the set temperature is smallest. Accordingly, it is possible to prevent a decrease in a cruising range due to the electric power consumption of the high voltage heater without decreasing effectiveness of the heating even in an environment of the low temperature external air.

In one embodiment, the water temperature gauge 300 may serve as a "liquid temperature detector". In one embodiment, the power unit 130 may serve as an "electric unit". In one embodiment, the ECU 400 may serve as a "pump controller".

The ECU 400 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least, one machine readable non-transitory tangible medium, to perform all or a part of functions of the ECU 400 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the ECU 400 illustrated in FIG. 1.

The invention claimed is:

1. A vehicle heat exchange system comprising:
a coolant circulation circuit in which a coolant for cooling an electric unit configured to allow a vehicle to travel is circulated by a pump;
a refrigerant circulation circuit in which a refrigerant for interior heating is circulated;
a pump controller configured to control a circulation flow rate of the coolant circulated in the coolant circulation circuit by the pump; and
a liquid temperature detector configured to detect a liquid temperature of the coolant before cooling the electric unit, wherein
the coolant circulation circuit comprises a radiator configured to dissipate heat of the coolant which has cooled the electric unit,
the refrigerant circulation circuit comprises an exterior heat exchanger disposed behind the radiator, the exterior heat exchanger being configured to cause the refrigerant to absorb heat from external air, and
the pump controller is configured to:
when the liquid temperature detected by the liquid temperature detector is equal to or higher than a predetermined temperature, maintain or increase the circulation flow rate in the coolant circulation circuit, and
when the liquid temperature detected by the liquid temperature detector is lower than the predetermined temperature, decrease the circulation flow rate in the coolant circulation circuit.

2. The vehicle heat exchange system according to claim 1, further comprising:
a high voltage heater configured to, when it is difficult to raise a temperature of conditioned air to be delivered to a vehicle cabin to a set temperature by heating the conditioned air with the refrigerant, raise the temperature of the conditioned air, wherein
the pump controller is configured to
calculate (i) a traveling electric power that is consumed when the electric unit operates, and (ii) a warm-up electric power that is consumed when the high voltage heater raises the conditioned air to the set temperature; and
set, as the predetermined temperature, the liquid temperature at a time when a sum of the traveling electric power and the warm-up electric power is smallest.

* * * * *